Aug. 18, 1931.  L. DANIELS  1,819,738
SPECTACLES
Filed Feb. 23, 1928
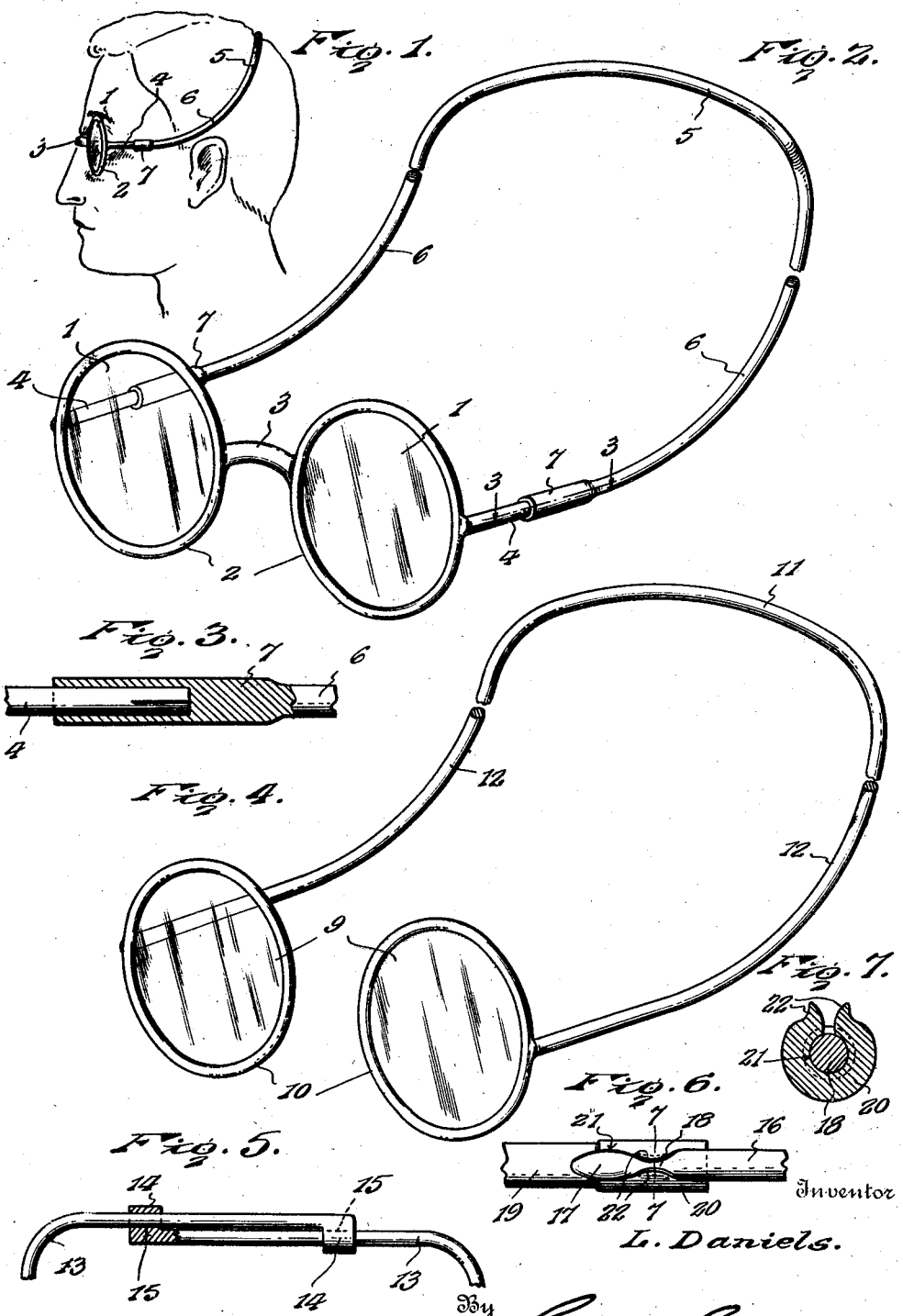

Patented Aug. 18, 1931

1,819,738

UNITED STATES PATENT OFFICE

LUDLOW DANIELS, OF DALLAS, TEXAS

SPECTACLES

Application filed February 23, 1928. Serial No. 256,333.

This invention relates to optics and more particularly to spectacles having improved temples. At the present time it is customary to provide spectacles with temples which extend rearwardly from the lenses and have their rear end portions curved so that they fit about the ears. This has been found to be uncomfortable as the spectacles are then balanced at the ears and their weight is principally borne by the bridge or nose piece which extends across and rests upon the upper portion of the nose. This pressure makes the spectables uncomfortable as they feel heavy upon the nose and the pressure exerted is such that it forms a groove or depression across the nose and irritates nerves in the nose. In some cases, the temples of the spectacles instead of having their rear end portions curved downwardly are bowed longitudinally to a certain extent so that they fit close against the sides of the head above the ears but this is also uncomfortable as it does not relieve the nose from the weight and pressure of the bridge and in addition the temples by gripping the sides of the head create pressure which is uncomfortable to the wearer and irritates nerves in the side portions of the head.

Therefore, one object of the invention is to provide improved temples which extend over the head in straddling relation thereto and by resting upon the rear portion of the top of the head support the weight of the glasses and thus relieve the nose and side portions of the head from pressure.

Another object of the invention is to permit the improved temples to conform to the size and contour of the head so that they fit properly thereon when the spectacles are in use.

Another object of the invention is to permit the head encircling portions of the temples to be removably engaged with portions projecting rearwardly from the lenses and thereby allow the head encircling portion to be applied to the temples of spectacles already in use or if bought with the glasses removed and transfer to other glasses when necessary.

The invention is illustrated in the accompanying drawings wherein

Figure 1 is a view showing the improved spectacles in use;

Fig. 2 is an enlarged perspective view of the improved spectacles;

Fig. 3 is a fragmentary longitudinal sectional view taken on the line 3—3 of Fig. 2 and illustrating a form of joint by means of which the head encircling portions of the temples may be connected with the portions of the temples which project rearwardly from the lenses;

Fig. 4 is a perspective view illustrating a modified form of spectacle;

Fig. 5 is a fragmentary top plan view showing a form of temples which may be readily adjusted transversely of the head in order to properly fit the same;

Fig. 6 is a fragmentary view illustrating a modified form of joint which may be employed in place of that shown in Fig. 3, and Fig. 7 is a transverse sectional view taken on the line 7—7 of Fig. 6.

The spectacles shown in Figs. 1 and 2 include the usual lenses 1 which are mounted in frames 2 joined by a nose piece or bridge 3. Temples 4 which are hinged to the frames 2 in the usual manner project rearwardly therefrom and will preferably be of approximately the length shown in Fig. 1, although they may be longer or shorter if so desired. It will be obvious that, if desired, the frames 2 may be omitted and the bridge 3 and temples 4 connected to the lenses in a conventional manner. The bow 5 which straddles the head transversely thereof is preferably formed of resilient metal, although celluloid or any other suitable composition which will permit it to be coiled when the spectacles are placed in a case may be employed. This bowed portion which may be referred to as part of the temples extends transversely across the top of the head adjacent the rear portion thereof and its arms 6 extend downwardly at opposite sides of the head above the ears and are then curved to project forwardly and have their free end portions 7 which may be of increased diameter, as shown in Fig. 3, formed with longitudinally extending pockets 8 to receive the rear end portions of the temples 4. It will thus be seen that the bowed portion which connects the temples may be supplied with the spectacles when sold or it may be sold as a separate article of manufacture and applied to the temples of spectacles already in use by merely cutting the temples at the proper distance from the lenses and fitting their end portions into the pockets.

In Fig. 4, there has been shown an embodiment of the invention in which the lenses 9 are mounted in frames 10 which are unconnected by a nose piece or bridge. The bow 11 shown in this figure is similar in construction to the bow 5 shown in Fig. 2, except that its arms 12 are of greater length than the arms 6 and instead of being formed with pockets to receive the rear ends of temples 4 are extended forwardly a sufficient distance to permit them to be connected with the frames 10. The forward ends of the arms 12 may be hinged or otherwise connected to the frames or the frames may be omitted and the temples directly applied to the lenses. When this form is employed, the resiliency of the material from which the temples are formed retains the lenses in proper spaced relation to each other in front of the eyes and as no bridge or nose piece is employed there will be no pressure whatever upon the nose.

Referring to Fig. 5, it will be seen that if it is desired to permit the temples to be adjusted transversely of the head after being applied the bowed portion may consist of separate members 13 instead of being formed from a single strand of material. These members 13 have their upper portions extending toward each other and overlapping and each is formed with a side extension 14 having an opening or bore 15 formed therein so that each member may be threaded through the opening 15 of the companion member. Therefore, the two members will be slidably connected but there will be sufficient frictional binding between the members to prevent them from slipping out of a set position when in use. It will thus be seen that temples of this type which are made to fit heads of an approximate size may be adjusted to accurately fit the individual head and they will be very comfortable when in use.

In Figs. 6 and 7, there has been illustrated a form of joint which may be employed in place of the joint shown in Fig. 3. When this form of joint is employed, the temples 16 which correspond to the temples 4 have their rear end portions ground to define a tapered head 17 which is joined to the body portion of the temple by a reduced neck 18. The arms 19 of the bow terminate in end portions 20 which are of increased diameter similar to the end portion 7 but of less length. Each of these end portions is formed with a longitudinally extending groove or pocket 21 of a diameter and contour to snugly receive the free end portion of the companion arm 16 of the bow and the intermediate portions of the side walls of the pocket are extended toward each other and then curved away from each other, as shown in Fig. 7, to provide jaws 22 which fit about the neck 18 of the arm 16. Since the material from which the temple is made is resilient, the arm of the bow can be forced into the seat or pocket 21 and it will be firmly gripped between the jaws and retained in place until the temple and bowed arm are grasped and force exerted to separate them.

When the spectacles are in use, the bowed portion of the improved temples fits about the head in straddling relation thereto and rests upon the top of the head adjacent the rear portion thereof along a line which would pass over the head above and slightly back of the ears with its arms extended downwardly at opposite sides of the head above the ears. The lenses are disposed in front of the eyes as is usual and the temples 4 or forward end portions of the arms 12 extend from the lenses along the sides of the face until they are joined to or merge into the arms of the bowed portion. By this arrangement the lenses will be firmly held in proper position with respect to the eyes but the nose and the ears will be relieved from pressure which ordinarily causes spectacles to be uncomfortable.

It is necessary for the bowed portion of the improved temples to be so adjusted as to fit the head at the point indicated, i. e. back of the tips of the ears. If the bowed portion is too far forward, it will not hold the spectacles securely and there will be a tendency for them to slip or wobble and if the bowed portion is fitted too far back on the head this will cause the spectacle frame to press against the nose. But fitted as indicated at a point slightly back of a line from the tips of the ears over the head it will be found that the spectacle frame will remain firmly in position under any circumstances and at the same time be so comfortable that no sense of contact at all will be felt when it is being worn.

Having thus described the invention, I claim:

1. Spectacles comprising lenses, and temples connected therewith and provided with straight forward end portions to extend rearwardly from the lenses towards a person's ears at opposite sides of the face and rear portions curved upwardly at a rearward incline and united to form a bow adapted to straddle a person's head transversely thereof rearwardly of the ears.

2. Spectacles including lenses, and temples comprising a bow adapted to straddle a person's head and having a bridge portion to extend across the top of a person's head transversely thereof back of the ears and arms extending downwardly from the bridge, the arms being curved downwardly and forwardly to bear against sides of a person's face above the ears and having horizontally disposed front end portions connected with the lenses.

3. Spectacles including lenses, and temples comprising a bow adapted to straddle a person's head and having a bridge portion to extend across the top of a person's head transversely thereof and arms sloping downwardly and forwardly from the bridge and terminating in front end portions disposed horizontally transversely of the bridge and connected to the lenses.

4. Spectacles including lenses, and temples comprising a bow adapted to straddle a person's head and having a bridge portion to extend across the top of a person's head transversely thereof and arms sloping downwardly and forwardly from the bridge and terminating in front end portions connected to the lenses.

In testimony whereof I affix my signature.

LUDLOW DANIELS. [L. S.]